(12) United States Patent
Perronnet et al.

(10) Patent No.: US 12,240,785 B2
(45) Date of Patent: Mar. 4, 2025

(54) GEOPOLYMER FOAM COMPOSITION

(71) Applicants: IMERTECH SAS, Paris (FR); CENTRE NATIONAL DE LA RECHERCHE SCIENTIFIQUE (C.N.R.S.), Paris (FR); UNIVERSITÉ DE LIMOGES, Limoges (FR)

(72) Inventors: Murielle Perronnet, Limoges (FR); Marie Arnoult, Limoges (FR); Sylvie Rossignol, Rilhac Rancon (FR)

(73) Assignee: Imertech SAS, Paris (FR)

( * ) Notice: Subject to any disclaimer, the term of this patent is extended or adjusted under 35 U.S.C. 154(b) by 790 days.

(21) Appl. No.: 17/312,541

(22) PCT Filed: Dec. 9, 2019

(86) PCT No.: PCT/EP2019/084248
§ 371 (c)(1),
(2) Date: Jun. 10, 2021

(87) PCT Pub. No.: WO2020/120405
PCT Pub. Date: Jun. 18, 2020

(65) Prior Publication Data
US 2022/0048822 A1    Feb. 17, 2022

(30) Foreign Application Priority Data

Dec. 10, 2018 (EP) .................................... 18306655

(51) Int. Cl.
| | |
|---|---|
| *C04B 28/00* | (2006.01) |
| *C04B 38/02* | (2006.01) |
| *C04B 38/10* | (2006.01) |
| *C04B 103/42* | (2006.01) |
| *C04B 111/28* | (2006.01) |
| *C04B 111/40* | (2006.01) |

(52) U.S. Cl.
CPC ............ *C04B 28/006* (2013.01); *C04B 38/02* (2013.01); *C04B 38/10* (2013.01); *C04B 2103/42* (2013.01); *C04B 2111/28* (2013.01); *C04B 2111/40* (2013.01); *C04B 2201/32* (2013.01); *C04B 2201/50* (2013.01)

(58) Field of Classification Search
CPC ....... C04B 28/006; C04B 38/02; C04B 38/10; C04B 2103/42; C04B 2111/28; C04B 2111/40; C04B 2201/32; C04B 2201/50; Y02P 40/10; Y02W 30/91
See application file for complete search history.

(56) References Cited

U.S. PATENT DOCUMENTS

| | | |
|---|---|---|
| 5,298,068 A | 3/1994 | Giesemann |
| 10,160,691 B2 | 12/2018 | Kerneos |
| 2018/0150753 A1 | 5/2018 | Farrell et al. |
| 2019/0056373 A1 | 2/2019 | Gharzouni et al. |

FOREIGN PATENT DOCUMENTS

| | | | | |
|---|---|---|---|---|
| CN | 105541374 A | * | 5/2016 | ............ C04B 38/02 |
| CN | 106518155 A | | 11/2017 | |
| CN | 105967535 A | | 8/2018 | |
| CN | 107746213 A1 | | 8/2020 | |
| DE | 102014003104 A1 | * | 12/2014 | ............ C04B 12/04 |
| EP | 3109217 A1 | | 12/2016 | |
| EP | 3360854 A1 | | 8/2018 | |
| EP | 3368888 A1 | | 9/2018 | |
| WO | WO-2014-146173 A1 | | 9/2014 | |
| WO | WO 2016/135347 A1 | | 9/2016 | |
| WO | WO 2018/024474 A1 | | 2/2018 | |
| WO | WO 2018/143205 A1 | | 8/2018 | |
| WO | WO 2018/150753 A1 | | 8/2018 | |

OTHER PUBLICATIONS

Hajimohammadi et al, "Combining chemical and mechanical foaming in geopolymer foam concretes" in International Conference on Alkali Activated Materials and Geopolymers: Versatile Materials Offering High Performance and Low Emissions, ECI Symposium Series, https://dc.engconfintl.org/geopolymers/74 (Year: 2018).*
Kovarik et al "Ceramic-like open-celled geopolymer foam as a porous substrate for water treatment catalyst" IOP Conf. Ser.: Mater. Sci. Eng. 175 012044, doi:10.1088/1757-899X/175/1/012044 (Year: 2017).*
International Search Report and Written Opinion mailed Jan. 15, 2020, in International Application No. PCT/EP2019/084248.
Fernandez-Jimenez, A., et al. "Microstructure development of alkali-activated fly ash cement: a descriptive model" Cement and Concrete Research 35 (2005) 1204-1209.

* cited by examiner

*Primary Examiner* — Anthony J Green
(74) *Attorney, Agent, or Firm* — Finnegan, Henderson, Farabow, Garrett & Dunner, LLP

(57) ABSTRACT

A geopolymer foam composition, an article comprising a geopolymer foam composition, methods for making a geopolymer foam composition, and uses of a geopolymer foam composition.

15 Claims, No Drawings

GEOPOLYMER FOAM COMPOSITION

CLAIM FOR PRIORITY

This application is a U.S. national phase entry under 35 U.S.C. § 371 from PCT International Application No. PCT/EP2019/084248, filed Dec. 9, 2019 which claims the benefit of priority of European Patent Application No. 18306655.4 filed Dec. 10, 2018, from both of which this application claims priority and both of which are incorporated herein by reference.

TECHNICAL FIELD

The present invention relates generally to geopolymer foam compositions comprising more than one type of aluminosilicate geopolymer foam. The present invention further relates to methods of making said geopolymer foam compositions and the various uses of said geopolymer foam compositions.

BACKGROUND

Various types of organic and inorganic materials may be used in building materials to provide various properties such as fire-resistance, heat-resistance, thermal insulation, sound insulation, mechanical resistance. In particular, these materials may be used to provide fire-resistance and/or heat-resistance without releasing volatile organic compounds (VOCs). These materials may further be used for filtration and/or for conduction, exchange and capture of chemical elements. It is therefore desirable to provide alternative and/or improved materials suitable for use in building materials, for example to provide one or more of fire-resistance (e.g. without VOC release), heat-resistance (e.g. without VOC release), thermal insulation, sound insulation, and mechanical resistance, and/or to be used for filtration and/or conduction, exchange and capture of chemical elements.

SUMMARY

In accordance with a first aspect of the present invention there is provided a geopolymer foam composition comprising a mechanically-foamed aluminosilicate geopolymer and a chemically-foamed aluminosilicate geopolymer.

In accordance with a second aspect of the present invention there is provided a geopolymer foam composition comprising an aluminosilicate geopolymer foam having an average pore size ranging from about 1 µm to about 500 µm and an aluminosilicate geopolymer foam having an average pore size ranging from greater than about 500 µm to about 5000 µm.

In accordance with a third aspect of the present invention there is provided a method for making a geopolymer foam composition, the method comprising combining a mechanically-foamed aluminosilicate geopolymer and a chemically-foamed aluminosilicate geopolymer. The geopolymer foam composition may, for example, be in accordance with the first and/or second aspect of the present invention, including any embodiment thereof.

In accordance with a fourth aspect of the present invention there is provided a method for making a geopolymer foam composition, the method comprising combining an aluminosilicate geopolymer foam composition having an average pore size ranging from about 1 µm to about 500 µm and a aluminosilicate geopolymer foam composition having an average pore size ranging from greater than about 500 µm to about 5000 µm. The geopolymer foam composition may, for example, be in accordance with the first and/or second aspect of the present invention, including any embodiment thereof.

In accordance with a fifth aspect of the present invention there is provided a geopolymer foam composition obtained by and/or obtainable by a method in accordance with the third or fourth aspect of the present invention.

In accordance with a sixth aspect of the present invention there is provided an article comprising a geopolymer foam composition in accordance with the first, second, or fifth aspect of the present invention.

In accordance with a seventh aspect of the present invention there is provided the use of a geopolymer foam composition in accordance with the first, second, or fifth aspect of the present invention for mechanical resistance, thermal insulation, sound insulation, heat-resistance, fire-resistance, filtration, and/or conduction, exchange and/or capture of chemical elements.

Certain embodiments of any aspect of the present invention may provide one or more of the following advantages:
  good (e.g. improved) mechanical resistance;
  good (e.g. improved) thermal insulation;
  good (e.g. improved) sound insulation;
  good (e.g. improved) heat-resistance;
  good (e.g. improved) fire-resistance
  good (e.g. improved) filtration capability;
  good (e.g. improved) conduction, exchange and/or capture of chemical elements.

The details, examples and preferences provided in relation to any particular one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION

Geopolymer Composition

There is provided herein a geopolymer foam composition comprising two different geopolymer foams. For example, there is provided herein a geopolymer foam composition comprising a mechanically-foamed aluminosilicate geopolymer and a chemically-foamed aluminosilicate geopolymer. For example, there is provided herein a geopolymer foam composition comprising an aluminosilicate geopolymer foam having an average pore size ranging from about 1 µm to about 500 µm and an aluminosilicate geopolymer foam having an average pore size ranging from greater than about 500 µm to about 5000 µm.

Aluminosilicate geopolymers result from the activation of an aluminosilicate source by an alkaline solution at ambient temperature. They may also be referred to as poly(sialate) (M)-PS, and may be represented by the formula $M_n[-(Si-O_2)_z-(Al-O_2)-]_n$ in which M is a monovalent cation, z defines the ratio Si:Al, and n is the degree of polymerisation. The aluminosilicate geopolymers may not comprise a Si—O—Ca network. Without wishing to be bound by theory, a polycondensation of aluminosilicate oxides occurs to provide an amorphous three dimensional geopolymer network. In accordance with Fernández-Jimenez A. et al. (Cement and Concrete Research, 35 (6), pages 1204 to 1209, 2005), a dissolution of a solid aluminosilicate by alkaline activation is the first reaction step and leads to the formation of oligomers (Si[OH]$_4$ and Al[OH]$_4^-$). A polycondensation reaction then links the oligomers, which generates an amorphous three-dimensional network. This process requires water, which is subsequently is partially removed from the product.

A foam composition is obtained by stirring to introduce gas bubbles, optionally in the presence of a surfactant and/or a porogen. Porogens are materials that react with the alkaline solution to produce gas, therefore assisting the formation of a foam. Geopolymer foams that are made using porogens are referred to as "chemically-foamed" geopolymers. Geopolymer foams that are made without porogens are referred to as "mechanically-foamed" geopolymers. It is possible to distinguish between mechanically-foamed geopolymers and chemically-foamed geopolymers by looking at average pore size of the geopolymers. Mechanically-foamed geopolymers tend to have a smaller average pore size than chemically-foamed geopolymers. Mechanically-foamed geopolymers have an average pore size ranging from about 1 μm to about 500 μm. Chemically-foamed geopolymers have an average pore size ranging from greater than about 500 μm to about 5000 μm.

Average pore size is evaluated by image analysis from pictures using the Image J software. The pores are assumed to be spherical and the mean pore diameter F is calculated for each cut using the equation $$\Gamma_v = \frac{\sum_{i=0}^{n} n_i d_i^4}{\sum_{i=0}^{n} n_i d_i^3}$$

where $d_i$=pore diameter for class i, $n_i/n$=number of pores inside the class i/total number of pores. At least 100 pores are measured in order to calculate the average (mean).

The geopolymer foam composition comprises two different geopolymer foams.

The first geopolymer foam may, for example, have an average pore size ranging from about 1 μm to about 500 μm. For example, the first geopolymer foam may have an average pore size ranging from about 2 μm to about 450 μm or from about 3 μm to about 400 μm or from about 4 μm to about 350 μm or from about 5 μm to about 300 μm or from about 10 μm to about 250 μm or from about 15 μm to about 200 μm or from about 20 μm to about 150 μm or from about 25 μm to about 125 μm. The first geopolymer foam may, for example, be a mechanically-foamed geopolymer.

The second geopolymer foam may, for example, have an average pore size ranging from greater than about 500 μm to about 5000 μm. For example, the second geopolymer foam may have an average pore size ranging from about 550 μm to about 4750 μm or from about 600 μm to about 4500 μm or from about 800 μm to about 4250 μm or from about 1000 μm to about 4000 μm or from about 1250 μm to about 3750 μm or from about 1500 μm to about 3500 μm or from about 1750 μm to about 3500 μm or from about 2000 μm to about 3500 μm or from about 2250 μm to about 3500 μm or from about 2500 μm to about 3500 μm or from about 2750 μm to about 3500 μm. The second geopolymer foam may, for example, be a chemically-foamed geopolymer.

The geopolymer foam composition may, for example, comprise from about 1 wt % to about 99 wt % of the first geopolymer foam (e.g. the mechanically-foamed geopolymer).

For example, the geopolymer foam composition may comprise from about 5 wt % to about 95 wt % or from about 10 wt % to about 90 wt % or from about 15 wt % to about 85 wt % or from about 20 wt % to about 80 wt % or from about 25 wt % to about 75 wt % or from about 30 wt % to about 70 wt % or from about 35 wt % to about 65 wt % or from about 40 wt % to about 60 wt % of the first geopolymer foam (e.g. the mechanically-foamed geopolymer).

The geopolymer foam composition may, for example, comprise from about 1 wt % to about 99 wt % of the second geopolymer foam (e.g. the chemically-foamed geopolymer). For example, the geopolymer foam composition may comprise from about 5 wt % to about 95 wt % or from about 10 wt % to about 90 wt % or from about 15 wt % to about 85 wt % or from about 20 wt % to about 80 wt % or from about 25 wt % to about 75 wt % or from about 30 wt % to about 70 wt % or from about 35 wt % to about 65 wt % or from about 40 wt % to about 60 wt % of the first geopolymer foam (e.g. the chemically-foamed geopolymer).

The ratio of the first geopolymer foam to the second geopolymer foam may, for example, range from about 1:99 to about 99:1. For example, the ratio of the first geopolymer foam to the second geopolymer foam may range from about 5:95 to about 95:5 or from about 10:90 to about 90:10 or from about 15:85 to about 85:15 or from about 20:80 to about 80:20 or from about 25:75 to about 75:25 or from about 30:70 to about 70:30 or from about 35:65 to about 65:35 or from about 40:60 to about 60:40.

The geopolymer foam composition may, for example, comprise, consist essentially of, or consist of a blend of two different geopolymer foams. For example, the geopolymer foam composition may comprise, consist essentially of, or consist of a blend of a mechanically-foamed geopolymer and a chemically-foamed geopolymer.

The geopolymer foam composition may, for example, have a multi-layered structure. The geopolymer foam composition may, for example, comprise at least one layer of one geopolymer foam (e.g. at least one layer of a mechanically-foamed geopolymer) and/or at least one layer of another geopolymer foam (e.g. at least one layer of a chemically-foamed geopolymer). The multi-layered geopolymer foam composition may or may not comprise a layer of a blend of two different geopolymer foams (e.g. a layer of a blend of a mechanically-foamed geopolymer and a chemically-foamed geopolymer).

The precise structure of a multi-layered geopolymer composition may be selected to obtain desired properties (e.g. desired size, weight, thermal insulation, mechanical resistance, fire resistance, sound insulation etc.).

A multi-layered geopolymer foam composition may, for example, comprise up to about 20 layers. For example, a multi-layered geopolymer foam composition may comprise from about 2 to about 20 or from about 2 to about 15 or from about 2 to about 10 or from about 2 to about 8 or from about 2 to about 6 or from about 2 to about 5 or from about 2 to about 4 layers. For example, a multi-layered geopolymer foam composition may comprise 2 or 3 layers.

A multi-layered geopolymer foam composition may, for example, comprise at least one layer of one geopolymer foam (e.g. at least one layer of a mechanically-foamed geopolymer) and at least one layer of another geopolymer foam (e.g. at least one layer of a chemically-foamed geopolymer). For example, the multi-layered geopolymer foam composition may comprise one layer of one geopolymer foam (e.g. one layer of a mechanically-foamed geopolymer) and one layer of another geopolymer foam (e.g. one layer of a chemically-foamed geopolymer).

A multi-layered geopolymer foam composition may, for example, comprise or consist of one layer of one geopolymer foam between two layers of another geopolymer foam (i.e. total of 3 layers). For example, a multi-layered geopolymer foam composition may comprise or consist of one layer of a chemically-foamed geopolymer between two layers of a mechanically-foamed geopolymer.

A multi-layered geopolymer foam composition may, for example, comprise or consist of one layer of one geopolymer foam that is surrounded by a layer of another geopolymer foam (i.e. a total of 2 layers). For example, a multi-layered geopolymer foam composition may comprise or consist of one layer of a chemically-foamed geopolymer that is surrounded by a layer of a mechanically-foamed geopolymer. For example, a multi-layered geopolymer foam composition may comprise or consist of one layer of a mechanically-foamed geopolymer that is surrounded by a layer of a chemically-foamed geopolymer. The multi-layered geopolymer foam composition may, for example, comprise of a tube having 2 concentric layers of geopolymer foam.

The thickness of each layer of a multi-layered geopolymer foam composition may, for example, be from about 1 mm to about 100 mm. For example, the thickness of each layer of a multi-layered geopolymer foam composition may be from about 1 mm to about 80 mm or from about 1 mm to about 60 mm or from about 1 mm to about 50 mm or from about 1 mm to about 40 mm or from about 2 mm to about 30 mm or from about 3 mm to about 25 mm or from about 4 mm to about 20 mm.

The overall thickness of a multi-layered geopolymer foam composition may, for example, be from about 2 mm to about 300 mm. For example, the overall thickness of a multi-layered geopolymer foam composition may be from about 2 mm to about 250 mm or from about 2 mm to about 200 mm or from about 2 mm to about 150 mm or from about 2 mm to about 100 mm or from about 2 mm to about 80 mm or from about 2 mm to about 70 mm or from about 4 mm to about 60 mm or from about 5 mm to about 50 mm or from about 5 mm to about 40 mm. Thickness refers to the dimension going through all the layers of the multi-layered composition.

Where the multi-layered composition has 3 layers, the middle layer may be thicker than each of the outside layers. For example, the middle layer may have a thickness ranging from about 20 mm to about 30 mm. For example, each of the outside layers may have a thickness ranging from about 4 mm to about 12 mm. The middle layer may, for example, be one type of geopolymer foam (e.g. chemically-foamed geopolymer) and both of the outside layers may be another type of geopolymer foam (e.g. mechanically-foamed geopolymer). The outside layers may, for example, be the same geopolymer foam. The outside layers may, for example, be identical.

Where the multi-layered composition has at least one layer of a first geopolymer foam and at least one layer of another geopolymer foam, the total thickness of the first geopolymer foam (e.g. mechanically-foamed aluminosilicate geopolymer) may be from about 10% to about 50% of the overall thickness of the multi-layered composition. For example, the total thickness of the first geopolymer foam (e.g. mechanically-foamed aluminosilicate geopolymer) may be from about 15% to about 45% or from about 20% to about 40% or from about 25% to about 35% of the overall thickness of the multi-layered composition.

Where the multi-layered composition has at least one layer of a first geopolymer foam and at least one layer of another geopolymer foam, the total thickness of the second geopolymer foam (e.g. chemically-foamed aluminosilicate geopolymer) may be from about 50% to about 90% of the overall thickness of the multi-layered composition. For example, the total thickness of the second geopolymer foam (e.g. chemically-foamed aluminosilicate geopolymer) may be from about 55% to about 85% or from about 60% to about 80% or from about 65% to about 75% of the overall thickness of the multi-layered composition.

Where the multi-layered composition has 3 layers, the middle layer may have a thickness that is about 50% to about 90% of the overall thickness of the multi-layered composition.

The middle layer may, for example, be a chemically-foamed geopolymer. For example, the middle layer may have a thickness that is from about 55% to about 85% or from about 60% to about 80% or from about 65% to about 75% of the overall thickness of the multi-layered composition. Each of the outside layers may have a thickness that is from about 5% to about 25% of the overall thickness of the multi-layered composition. For example, each of the outside layers may have a thickness that is from about 10% to about 20% of the overall thickness of the multi-layered composition.

The geopolymer foam composition may, for example, comprise from about 50 wt % to about 99 wt % of an amorphous phase. For example, the geopolymer foam composition may comprise from about 55 wt % to about 98 wt % or from about 60 wt % to about 97 wt % or from about 65 wt % to about 96 wt % or from about 70 wt % to about 95 wt % or from about 75 wt % to about 90 wt % of an amorphous phase.

Amount of amorphous phase in the geopolymer foam composition is measured by X-Ray diffraction as obtained by acquiring an X-ray diffractogram on <40 μm unoriented geopolymer foam composition powder with 30% zincite as internal standard and modelling the diffractogram by Topas software (Bruker).

The geopolymer foam composition may, for example, comprise from about 0 wt % to about 40 wt % of unreacted fillers. For example, the geopolymer foam composition may comprise from about 0 wt % to about 35 wt % or from about 0.5 wt % to about 30 wt % or from about 1 wt % to about 25 wt % or from about 2 wt % to about 20 wt % or from about 3 wt % to about 15 wt % unreacted fillers.

Amount of unreacted fillers in the geopolymer foam composition is measured by X-Ray diffraction as described above.

The geopolymer foam composition may, for example, further comprise one or more fillers. For example, the first (e.g. mechanically-foamed) and/or second (e.g. chemically-foamed) geopolymer foam may comprise one or more fillers.

Fillers may be added to the geopolymer foam composition, for example in order to increase the mechanical resistance and/or stabilize gas dispersion before the foam is consolidated. Examples of fillers include, for example, silicates, silicas, aluminosilicates, graphene platelets, graphite, fibres, and mixtures thereof. The filler may, for example, be selected from mica, fireclay, chamotte, quartz, quartz sands, silica fume, perlite, diatomaceous earth, talc, andalusite, wollastonite, glass cullets, silica fibres, polyvinyl alcohol (PVA) fibres, polypropylene (PP) fibres or mixtures thereof. In particular, the geopolymer foam composition may further comprise one or more fibres. The fibres may, for example, be inorganic or organic. The fibres may, for example, be natural or synthetic.

Examples of inorganic fibres include basalt fibres, aluminosilicate fibres, ceramic fibres, glass fibres, and graphene fibres. Examples of organic fibres include bamboo fibres, miscanthus fibres, sisal fibre, rice husk fibres, corn husk fibres, cotton fibres, hemp fibres, jute fibres and polymer fibres (e.g. PVA fibres or PP fibres). For example, the first (e.g. mechanically-foamed) and/or second (e.g. chemically-foamed) geopolymer foam may comprise one or more fibres (e.g. silica fibres).

For example, the geopolymer foam composition may comprise up to about 40 wt % fillers. For example, the geopolymer foam composition may comprise up to about 35 wt % or up to about 30 wt % or up to about 25 wt % or up to about 20 wt % or up to about 15 wt % or up to about 10 wt % or up to about 8 wt % fillers. For example, the geopolymer foam composition may comprise from about 0.5 wt % to about 40 wt % fillers or from about 1 wt % to about 20 wt % or from about 2 wt % to about 15 wt % or from about 3 wt % to about 10 wt % fillers. The fillers may, for example, be fibres.

For example, the first (e.g. mechanically-foamed) and/or second (e.g. chemically-foamed) geopolymer foam may comprise up to about 40 wt % fillers. For example, the first (e.g. mechanically-foamed) and/or second (e.g. chemically-foamed) geopolymer foam may comprise up to about 35 wt % or up to about 30 wt % or up to about 25 wt % or up to about 20 wt % or up to about 15 wt % or up to about 10 wt % or up to about 8 wt % fillers. For example, the first (e.g. mechanically-foamed) and/or second (e.g. chemically-foamed) geopolymer foam may comprise from about 0.5 wt % to about 40 wt % fillers or from about 1 wt % to about 20 wt % or from about 2 wt % to about 15 wt % or from about 3 wt % to about 10 wt % fillers. The fillers may, for example, be fibres.

The geopolymer foam composition may, for example, further comprise one or more surfactants. For example, the first (e.g. mechanically-foamed) and/or second (e.g. chemically-foamed) geopolymer foam may comprise one or more surfactants.

Surfactants may be added to the geopolymer foam composition in order to stabilize the liquid-air interface by better trapping generated gas in the suspension. Examples of surfactants include, for example, non-ionic surfactants such as polyethers (e.g. alkyl polyglucoside) and polyols, and anionic surfactants such as carboxylates, sulphates, sulphonates, and phosphates. In particular, the geopolymer foam composition may further comprise one or more non-ionic or anionic surfactants. For example, the first (e.g. mechanically-foamed) and/or second (e.g. chemically-foamed) geopolymer foam may comprise one or more non-ionic or anionic surfactants.

For example, the geopolymer foam composition may comprise up to about 2 wt % surfactant. For example, the geopolymer foam composition may comprise up to about 1.5 wt % or up to about 1 wt % or up to about 0.5 wt % surfactant. For example, the geopolymer foam composition may comprise from about 0.01 wt % to about 2 wt % surfactant or from about 0.05 wt % to about 1.5 wt % surfactant or from about 0.1 wt % to about 1 wt % surfactant.

For example, the first (e.g. mechanically-foamed) and/or second (e.g. chemically-foamed) geopolymer foam may comprise up to about 2 wt % surfactant. For example, the first (e.g. mechanically-foamed) and/or second (e.g. chemically-foamed) geopolymer foam may comprise up to about 1.5 wt % or up to about 1 wt % or up to about 0.5 wt % surfactant. For example, the first (e.g. mechanically-foamed) and/or second (e.g. chemically-foamed) geopolymer foam may comprise from about 0.01 wt % to about 2 wt % surfactant or from about 0.05 wt % to about 1.5 wt % surfactant or from about 0.1 wt % to about 1 wt % surfactant.

The geopolymer foam composition may, for example, be cured. The geopolymer foam composition may, for example, be a solid or may be a castable fluid. For example, the geopolymer foam composition may be a suspension (e.g. aqueous suspension).

The geopolymer foam composition may, for example, be cured, for example, in a mold, such that it forms any desirable shape. After curing, the geopolymer foam composition may, for example, be processed to form a desired shape or to form a particulate material, for example, by crushing or grinding. The geopolymer foam composition may, for example, be granulated.

The geopolymer foam composition may, for example, be a class A (e.g. A1 or A1) fire-resistant material.

The fire-resistance of materials may be classified in accordance with EN 13501-1.

The geopolymer foam composition may, for example, have a compression resistance equal to or greater than about 0.01 MPa. For example, the geopolymer composition may have a compression resistance equal to or greater than about 0.1 MPa or equal to or greater than about 0.5 MPa or equal to or greater than about 1 MPa or equal to or greater than about 2 MPa or equal to or greater than about 5 MPa or equal to or greater than about 10 M Pa or equal to or greater than about 15 M Pa or equal to or greater than about 20 MPa or equal to or greater than about 25 MPa or equal to or greater than about 30 MPa. For example, the geopolymer composition may have a compression resistance up to about 100 MPa or up to about 90 MPa or up to about 80 MPa or up to about 70 MPa or up to about 60 MPa or up to about 50 M Pa. For example, the geopolymer composition may have a compression resistance from about 0.1 MPa to about 100 MPa or from about 0.5 MPa to about 80 MPa or from about 1 MPa to about 60 MPa or from about 2 MPa to about 50 MPa or from about 5 MPa to about 40 MPa.

Compression resistance may be measured in accordance with NF EN 826. A LLOYD EZ20 universal testing machine with a crosshead speed of 0.5 mm/min may be used. The compressive test may be performed on at least three samples for every formulation. The samples may be parallelepipedic in shape with a width of 50 mm, a length of 50 mm and a height of approximately 25 mm, and may be aged for 7 days.

The geopolymer foam composition may, for example, have a thermal conductivity equal to or less than about 300 $mW \cdot m^{-1} \cdot K^{-1}$. For example, the geopolymer foam composition may have a thermal conductivity equal to or less than about 280 $mW \cdot m^{-1} \cdot K^{-1}$ or equal to or less than about 260 $mW \cdot m^{-1} \cdot K^{-1}$ or equal to or less than about 250 $mW \cdot m^{-1} \cdot K^{-1}$ or equal to or less than about 240 $mW \cdot m^{-1} \cdot K^{-1}$ or equal to or less than about 220 $mW \cdot m^{-1} \cdot K^{-1}$ or equal to or less than about 200 $mW \cdot m^{-1} \cdot K^{-1}$ or equal to or less than about 180 $mW \cdot m^{-1} \cdot K^{-1}$ or equal to or less than about 160 $mW \cdot m^{-1} \cdot K^{-1}$ or equal to or less than about 150 $mW \cdot m^{-1} \cdot K^{-1}$ or equal to or less than about 140 $mW \cdot m^{-1} \cdot K^{-1}$ or equal to or less than about 120 $mW \cdot m^{-1} \cdot K^{-1}$ or equal to or less than about 100 $mW \cdot m^{-1} \cdot K^{-1}$ or equal to or less than about 80 $mW \cdot m^{-1} \cdot K^{-1}$ or equal to or less than about 60 $mW \cdot m^{-1} \cdot K^{-1}$ or equal to or less than about 50 $mW \cdot m^{-1} \cdot K^{-1}$ or equal to or less than about 40 $mW \cdot m^{-1} \cdot K^{-1}$. For example, the geopolymer foam composition may have a thermal conductivity equal to or greater than about 10 $mW \cdot m^{-1} \cdot K^{-1}$ or equal to or greater than about 20 $mW \cdot m^{-1} \cdot K^{-1}$ or equal to or greater than about 30 $mW \cdot m^{-1} \cdot K^{-1}$. For example, the geopolymer foam composition may have a thermal conductivity from about 10 mW·m$^{-1}$·K$^{-1}$ to about 300 mW·m$^{-1}$·K$^{-1}$ or from about 20 mW·m$^{-1}$·K$^{-1}$ to about 200 mW·m$^{-1}$·K$^{-1}$ or from about 30 mW·m$^{-1}$·K$^{-1}$ to about 100 mW·m$^{-1}$·K$^{-1}$ or from about 30 mW·m$^{-1}$·K$^{-1}$ to about 50 mW·m$^{-1}$·K$^{-1}$.

Thermal conductivity may be measured by determined using the "hot disk" method (ISO Standard 22007-2) using the Hot disk TPS 1500 with a radius of 6.403 mm by placing the sensor between two elements of the same sample.

The geopolymer foam composition may, for example, have an absorption coefficient equal to or greater than about 0.2 at 1000 Hz. For example, the geopolymer foam composition may have an absorption coefficient equal to or greater than about 0.3 or equal to or greater than about 0.4 or equal to or greater than about 0.5 or equal to or greater than about 0.6 or equal to or greater than about 0.7 or equal to or greater than about 0.8 at 1000 Hz. For example, the geopolymer foam composition may have an absorption coefficient up to about 1 or up to about 0.9 at 1000 Hz.

The absorption coefficient may be measured by the impedance tube method in accordance with NF EN ISO 10534-2.

The geopolymer foam composition may, for example, have a bulk density ranging from about 0.05 g/cm$^3$ to about 1.2 g/cm$^3$, for example from about 0.08 g/cm$^3$ to about 1.15 g/cm$^3$ or from about 0.1 g/cm$^3$ to about 1 g/cm$^3$ or from about 0.2 g/cm$^3$ to about 0.8 g/cm$^3$ or from about 0.3 g/cm$^3$ to about 0.7 g/cm$^3$ or from about 0.4 g/cm$^3$ to about 0.6 g/cm$^3$.

The bulk density p may be calculated by dividing the mass of cylindrical samples by its apparent volume. The density of the dense matrix (theoretical density of the pore-free solid material) $\rho_0$ is determined with an Accupyc 1330 (Micrometrics) helium pycnometer with a 1 cm$^3$ cell. Then, an estimation of the pore volume fraction xp can be determined with the equation $xp=100*(1-(\rho/\rho_0))$.

There is further provided herein products and articles comprising the geopolymer foam compositions described herein. Examples of products and articles comprising the geopolymer foam composition include, for example, building materials, mortars, concretes, cements, coatings, waste management articles for toxic or nuclear waste immobilization, geopolymeric high-tech/fiber reinforced composites, geopolymeric foams, e.g. for insulation, fire-proof coatings, foundry equipment, bricks, resins, binders, roads, pavements, or the like.

Method for Making Geopolymer Composition

There is further provided herein a method for making a geopolymer foam composition, the method comprising combining two different geopolymer foams. For example, there is provided herein a method for making a geopolymer foam composition, the method comprising combining a mechanically-foamed aluminosilicate geopolymer and a chemically-foamed aluminosilicate geopolymer. For example, there is provided herein a method for making a geopolymer foam composition, the method comprising combining an aluminosilicate geopolymer foam having an average pore size ranging from about 1 µm to about 500 µm and an aluminosilicate geopolymer foam having an average pore size ranging from greater than about 500 µm to about 5000 µm.

The geopolymer foam composition made by this may, for example, be in accordance with the geopolymer foam compositions described herein, including all embodiments thereof.

The method may, for example, comprise one or more of mixing, casting, and curing, in any order. The geopolymer foam compositions may, for example, be cast (e.g. using a mold) into any suitable shape.

The geopolymer foam composition may, for example, be cured under any suitable conditions. For example, the geopolymer foam composition may be cured at a temperature ranging from about 10° C. to about 100° C., for example from about 15° C. to about 90° C. or from about 20° C. to about 80° C. or from about 20° C. to about 70° C. For example, the geopolymer foam composition may be cured for a period of time ranging from about 30 minutes to about 72 hours, for example from about 2 hours to about 60 hours or from about 6 hours to about 56 hours or from about 12 hours to about 48 hours or from about 12 hours to about 24 hours. For example, the geopolymer foam composition may be cured at a relative humidity of at least about 50%, for example at least about 60% or at least about 70% or at least about 80% or at least about 90%. For example, the geopolymer foam composition may be cured at a relative humidity up to about 100% or up to about 99% or up to about 98% or up to about 95%.

The method may, for example, comprise blending one geopolymer foam with another geopolymer foam. For example, the method may comprise blending a mechanically-foamed aluminosilicate geopolymer with a chemically-foamed aluminosilicate geopolymer. For example, the method may comprise blending an aluminosilicate geopolymer foam having an average pore size ranging from about 1 µm to about 500 µm and an aluminosilicate geopolymer foam having an average pore size ranging from greater than about 500 µm to about 5000 µm.

The geopolymer foam composition may, for example, be blended using any suitable equipment such as the IKA RW20 digital overhead stirrer, for example using shaft (crossed), straight, or pitched blade.

Where the method comprises blending a first geopolymer foam with a second geopolymer foam, the method may further comprise casting the blend of the first geopolymer foam and second geopolymer foam. The two different geopolymer foams may not be cured before they are blended. For example, the two different geopolymer foams may be cured after they are blended and/or after they (e.g. the blend) are casted.

The method may, for example, comprise forming layers of different geopolymer foams. For example, the method may comprise forming at least one layer of one geopolymer foam (e.g. at least one layer of a mechanically-foamed geopolymer) and at least one layer of another geopolymer foam (e.g. at least one layer of a chemically-foamed geopolymer). For example, the method may comprise forming one layer of one geopolymer foam (e.g. one layer of a mechanically-foamed geopolymer) and one layer of another geopolymer foam (e.g. one layer of a chemically-foamed geopolymer). For example, the method may comprise forming one layer of one geopolymer foam between two layers of another geopolymer foam (i.e. total of 3 layers). For example, the method may comprise forming one layer of a chemically-foamed geopolymer between two layers of a mechanically-foamed geopolymer.

The layers may be formed sequentially, one on top of another. Alternatively, the layers may be formed separately and then combined to form a multi-layered structure. The layers may, for example, be cured before they are combined with the other layer(s). For example, where the layers are formed sequentially one on top of another, each layer may be cured before the next layer is formed.

After curing, the geopolymer foam compositions may be further processed into a desired shape or particulate material, for example, by crushing, cutting, or grinding. For example, the geopolymer foam compositions may be processed to form a particulate material with a desired particle size.

The method for making the geopolymer foam compositions described herein may, for example, comprise making one or more of the different geopolymer foams present in the geopolymer foam composition. For example, the method for making the geopolymer foam compositions may comprise making a mechanically-foamed aluminosilicate geopolymer and/or making a chemically foamed aluminosilicate geopolymer. For example, the method for making the geopolymer foam composition may comprise making an aluminosilicate geopolymer foam having an average pore size ranging from about 1 µm to about 500 µm and/or an aluminosilicate geopolymer foam having an average pore size ranging from greater than about 500 µm to about 5000 µm.

The method for making each type of aluminosilicate geopolymer foam in the geopolymer foam composition may comprise mixing an aluminosilicate with an alkaline solution. For example, the method for making each type of aluminosilicate geopolymer foam may comprise mixing an aluminosilicate with a silicate solution, for example a silicate solution containing an alkali metal such as lithium, sodium, potassium, rubidium, or caesium.

The method for making each type of aluminosilicate geopolymer foam in the geopolymer foam composition may comprise mixing a dry composition with water. The dry composition may, for example, comprise an aluminosilicate, an alkali metal hydroxide, and an alkali metal silicate. The dry composition may, for example, optionally comprise a porogen. As used herein, "dry" must be understood as having a level of moisture content of less than 10% by weight, for example less than 5% by weight, less than 2% by weight, less than 1% by weight, or less than 0.5% by weight, which for the dry particulate composition is determined by a loss of weight after drying at 110° C. The amount of water added to the dry composition may, for example, be equal to or less than about 50 wt % based on the total weight of the dry composition. The quantity of water added may, for example, be from about 15% by weight to about 40% by weight or the quantity of water may, for example, be from about 20% by weight to about 35% by weight, so as to be, for example, about 25% by weight or about 28% by weight or about 30% by weight or about 32% by weight, based on the total weight of the dry composition. The dry composition may, for example, be as described in WO 2016/135347 A1 and/or WO 2018/024474 A1, the contents of which are incorporated herein by reference.

Use of a dry composition, to which water may be added to form the geopolymer, advantageously eliminates the use of strongly basic and corrosive alkaline solutions at the stage of forming the geopolymer. The time of obtaining the geopolymer may also be reduced due to the single-step process of mixing the precursor with water. The difference in solubility of the various components of the dry composition allows the geopolymer to be obtained.

The aluminosilicate may, for example, be selected from metakaolin, fly ash, halloysite, metahalloysite, slag, rock dust, fine sand, activated clay, and mixtures thereof. For example, the aluminosilicate may be metakaolin.

The aluminosilicate may, for example, have an amorphous phase content of at least about 35 wt % based on the total weight of the aluminosilicate. For example, the aluminosilicate may have an amorphous phase of at least about 40 wt % or at least about 45 wt % or at least about 50 wt % or at least about 55 wt % or at least about 60 wt % or at least about 65 wt % or at least about 70 wt % or at least about 75 wt % or at least about 80 wt % or at least about 85 wt % or at least about 90 wt % based on the total weight of the aluminosilicate.

The amount of amorphous phase in the aluminosilicate may be determined by quantitative X-Ray diffraction as obtained by acquiring an X-ray diffractogram on <40 µm unoriented aluminosilicate powder with 30% zincite as internal standard and modelling the diffractogram by Topas software (Bruker).

The aluminosilicate may, for example, have a specific surface area ranging from about 1 $m^2/g$ to about 50 $m^2/g$, for example from about 1 $m^2/g$ to about 45 $m^2/g$ or from about 2 $m^2/g$ to about 40 $m^2/g$ or from about 3 $m^2/g$ to about 35 $m^2/g$ or from about 4 $m^2/g$ to about 30 $m^2/g$ or from about 5 $m^2/g$ to about 25 $m^2/g$ or from about 5 $m^2/g$ to about 20 $m^2/g$ or from about 5 $m^2/g$ to about 15 $m^2/g$ or from about 7 $m^2/g$ to about 15 $m^2/g$ or from about 8 $m^2/g$ to about 15 $m^2/g$ or from about 10 $m^2/g$ to about 15 $m^2/g$.

As used herein, "specific surface area" refers to a BET surface area. "BET surface area," as used herein, refers to the technique for calculating specific surface area of physical absorption molecules according to Brunauer, Emmett, and Teller ("BET") theory. BET surface area can be measured with a Gemini III 2375 Surface Area Analyzer, using nitrogen as the sorbent gas, from Micromeritics Instrument Corporation (Norcross, Ga., USA).

The aluminosilicate may, for example, be processed, for example by crushing, grinding, and/or sieving to obtain a desired particle size distribution. For example, the aluminosilicate may have a particle size distribution such that it has a $d_{10}$ ranging from about 2 µm to about 50 µm and/or a $d_{50}$ ranging from about 3 µm to about 700 µm and/or a $d_{90}$ ranging from about 20 µm to about 2000 µm.

Particle size distribution may be measured using a laser particle size analyzer (Mastersizer 2000) with a dry sample changer. The powder is suspended by an air current flowing through a glass cell with parallel faces illuminated by a beam of laser light. The measurement is made at a pressure of 2 bar. The measureable particle size may indicate the relative coarseness of the aluminosilicate.

The amount of aluminosilicate used in the method may, for example be from about 20 wt % to about 65 wt % based on the total starting materials used to form the geopolymer. For example, the amount of aluminosilicate used in the method may be from about 25 wt % to about 65 wt % or from about 30 wt % to about 60 wt % or from about 35 wt % to about 55 wt % or from about 40 wt % to about 50 wt % based on the total starting materials used to form the geopolymer.

The alkaline solution may, for example, comprise a silicate and/or a hydroxide. The silicate and/or the hydroxide may, for example, contain an alkali metal such as lithium, sodium, or potassium. The silicate solution may, for example, have a molar ratio of silicon to metal ranging between about 0.4 and about 1. The alkaline solution may, for example, be sodium silicate, sodium metasilicate (waterglass) and/or potassium silicate. The alkaline solution may, for example, be obtained commercially (e.g. waterglass). The alkaline solution may, for example, be prepared by the dissolution of KOH and/or NaOH and amorphous silica in water (e.g. osmotically purified water), for example at room temperature.

The amount of alkaline solution used in the method may, for example, be from about 40 wt % to about 75 wt % based on the total starting materials used to form the geopolymer.

For example, the amount of alkaline solution used in the method may be from about 45 wt % to about 70 wt % or from about 50 wt % to about 65 wt % or from about 55 wt % to about 60 wt % based on the total starting materials used to form the geopolymer.

The alkali metal hydroxide may, for example, be one of NaOH, KOH, LiOH, RbOH, or CsOH, or a mixture thereof. Preferred alkali metal hydroxides are NaOH, KOH, and LiOH. The alkali metal silicate for use in the dry particulate composition may be selected from the group consisting of Na, K, Li, Rb, Cs, and mixtures thereof.

The method for making each type of aluminosilicate geopolymer foam in the geopolymer foam composition may further comprise mixing one or more fillers and/or one or more surfactants.

Any fillers (e.g. fibres) may, for example, be mixed after they are added to the geopolymer foam composition in order to disperse the fillers into the geopolymer mixture, for example using any suitable mixing equipment such as, for example, whisks, blades, and kneading tools. This mixing step is separate to the mixing step that produces the foam (foaming step). For example, the fibres may be mixed at a speed ranging from about 500 rpm to about 2500 rpm, for example from about 1000 rpm to about 2500 rpm. The fibres may, for example, be mixed for a period of time ranging from about 15 minutes to about 60 minutes, for example from about 20 minutes to about 45 minutes. The total energy input whilst mixing the fibres may, for example, be from about 20,000 J to about 35,000 J, for example from about 24,000 J to about 34,000 J.

The amount of filler, where present, used in the method may, for example, be up to about 40 wt % based on the total starting materials used to form the geopolymer. For example, the amount of filler may be up to about 35 wt % or up to about 30 wt % or up to about 25 wt % or up to about 20 wt % or up to about 15 wt % or up to about 10 wt % or up to about 8 wt % based on the total starting materials used to form the geopolymer. For example, the amount of filler may be from about 0.5 wt % to about 40 wt % or from about 1 wt % to about 20 wt % or from about 2 wt % to about 15 wt % or from about 3 wt % to about 10 wt % based on the total starting materials used to form the geopolymer. The fillers may, for example, be fibres.

The amount of surfactant, where present, used in the method may, for example, be up to about 2 wt % based on the total starting materials used to form the geopolymer. For example, the amount of surfactant may be up to about 1.5 wt % or up to about 1 wt % or up to about 0.5 wt % surfactant. For example, the amount of surfactant may be from about 0.01 wt % to about 2 wt % or from about 0.05 wt % to about 1.5 wt % surfactant or from about 0.1 wt % to about 1 wt % based on the total starting materials used to form the geopolymer.

The method for making each type of aluminosilicate geopolymer foam in the geopolymer foam composition may further comprise mixing one or more porogens. In particular, methods for making chemically-foamed aluminosilicate geopolymers involve the addition of one or more porogens. Methods for making mechanically-foamed aluminosilicate geopolymers do not involve the addition of one or more porogens. For example, methods for making an aluminosilicate geopolymer having an average pore size from greater than about 500 μm to about 5000 μm may involve using one or more porogens. For example, methods for making an aluminosilicate geopolymer having an average pore size from about 1 μm to about 500 μm may not involve using one or more porogens. The porogen may, for example, be aluminium, silicon, silica fume, $H_2O_2$, or a mixture thereof. For example, the porogen may be a mixture of aluminium and silicon ($Al^0$ and) $Si^0$, for example having a weight ratio ranging from about 1:99 to about 99:1 or from about 10:90 to about 90:10 or from about 25:75 to about 75:25 or from about 40:60 to about 60:40.

The porogen may, for example, be used in an amount up to about 2 wt % based on the total starting materials used to form the geopolymer. For example, the porogen may be used in an amount up to about 1.5 wt % or up to about 1 wt % or up to about 0.5 wt % based on the total starting materials used to form the geopolymer. For example, the porogen may be used in an amount of at least about 0.1 wt % or at least about 0.2 wt % or at least about 0.5 wt % based on the total starting materials used to form the geopolymer. For example, the porogen may be used in an amount from about 0.1 wt % to about 2 wt % or from about 0.2 wt % to about 1.5 wt % or from about 0.5 wt % to about 1 wt % based on the total starting materials used to form the geopolymer.

The precise conditions used to make each geopolymer foam (e.g. starting materials, mixing conditions, order of addition, curing conditions) may be selected in order to obtain a geopolymer with desired properties (e.g. desired heat insulation, sound insulation, mechanical strength, filtration capability, chemical element conduction, exchange and capture capability etc.).

In the methods for making each type of aluminosilicate geopolymer foam in the geopolymer foam composition, any suitable mixing equipment may be used such as, for example, whisks, blades, and kneading tools. This produces the geopolymer foam (foaming step).

The aluminosilicate, alkaline solution, and other optional additives may be mixed at a speed ranging from about 100 rpm to about 3000 rpm, for example from about 200 rpm to about 3000 rpm or from about 300 rpm to about 2500 rpm or from about 400 rpm to about 2000 rpm or from about 500 rpm to about 1500 rpm or from about 500 rpm to about 1400 rpm or from about 600 rpm to about 1200 rpm. The aluminosilicate, alkaline solution, and other optional additives may, for example, be mixed for from about 5 seconds to about 60 minutes, for example from about 10 seconds to about 50 minutes or from about 20 seconds to about 40 minutes or from about 25 seconds to about 30 minutes or from about 0.5 minutes to about 25 minutes or from about 0.5 minutes to about 20 minutes or from about 0.5 minutes to about 10 minutes or from about 0.5 minutes to about 6 minutes or from about 0.5 minutes to about 5 minutes. The total energy input may, for example, be from about 40 J to about 400000 J, for example from about 50 J to about 100000 J or from about 100 J to about 50000 J or from about 200 J to about 10000 J or from about 300 J to about 5000 J or from about 400 J to about 4000 J or from about 500 J to about 3600 J or from about 500 J to about 3000 J or from about 500 J to about 2500 J or from about 500 J to about 2000 J or from about 500 J to about 1500 J. Increasing the speed of mixing may increase the thermal conductivity of the geopolymer foam. Increasing the time of mixing may decrease the thermal conductivity and/or mechanical resistance of the geopolymer foam.

The energy input during mixing may be determined from the power (when the blade was run without a load at a defined speed), the stirring speed and a corrective factor which accounts for the time required to homogenize a suspension when different mixing blades are used. Depending on the blade, the time needed to homogenize the mixture is different. For a given speed (e.g. 200 rpm), the needed time was determined and used to calculate the corrective factor.

Any suitable order of addition may be used to make the geopolymer foams. Addition of the surfactant earlier in the process, for example, before the filler (e.g. fibres) are added, may result in a geopolymer foam with decreased thermal conductivity and/or mechanical resistance.

Uses of Geopolymer Composition

The geopolymer foam compositions described herein may be used for compression resistance, thermal insulation, sound insulation, heat-resistance, fire-resistance, filtration, and/or conduction, exchange and/or capture of chemical elements. For example, the geopolymer foam compositions described herein may be used in the formation of a wellbore.

For example, the geopolymer foam compositions may be used in various products and articles such as, for example, refractory products, building materials, mortars, concretes, cements, coatings, waste management articles for toxic or nuclear waste immobilization, geopolymeric high-tech/fiber reinforced composites, geopolymeric foams, e.g. for insulation, fire-proof coatings, foundry equipment, bricks, resins, binders, roads, pavements, or the like.

EXAMPLES

Example 1—Mechanically-Foamed Geopolymer (Comparative)

A mechanically-foamed geopolymer was made by blending 61 wt % of a mixed silicate solution (Na, K) having a molar ratio of 0.58 and a concentration of 5.5 mol·L$^{-1}$ with 35 wt % of a metakaolin, followed by addition of 4 wt % of silica fibres, then 0.12 wt % of an alkyl polyglucoside non-ionic surfactant.

The method was performed in a 630 cm$^3$ recipient.

The fibres were dispersed in the mixture by stirring at 2100 rpm for 30 minutes using a IKA RW20 digital overhead stirrer after being added to the mixture used to make the geopolymer. The estimated energy input during stirring of the fibres was 25,200 J.

The mixture was then stirred at 1200 rpm for 0.5 minutes using a IKA RW20 digital overhead stirrer with a pitched blade to form the geopolymer foam. The estimated energy input during foaming was 540 J.

The geopolymer was cured at 40° C. in 100% HR atmosphere for 24 hours. Then, the material was dried at 40° C. before compressive and thermal analysis.

The porosity of the geopolymer was 50% with a density of 1.08 g·cm$^3$. The average pore size was 42 μm.

The thermal conductivity of the geopolymer was determined by the "hot disk" method (ISO Standard 22007-2) using the Hot disk TPS 1500 with a radius of 6.403 mm by placing the sensor between two elements of the same sample. The measurement was performed on spherical samples with a diameter of 50 mm and a height of 25 mm. The analysis temperature was 20° C., the power used was 0.050 W and the measurement time was 80 s. The measurement was repeated 3 times per sample and the mean value calculated.

The thermal conductivity of the geopolymer was 237 mW·m$^{-1}$·K$^{-1}$.

The compressive strength of the geopolymer was determined using a LLOYD EZ20 universal testing machine with a crosshead speed of 0.5 mm/minute. The measurement was repeated 5 times per sample and the mean value calculated. The samples were cylindrical in shape with a diameter of 15 mm and height of approximately 30 mm and were aged for 7 days in an open mold at room temperature.

The compressive strength of the geopolymer was 35 MPa.

Example 2—Mechanically-Foamed Geopolymer (Comparative)

A mechanically-foamed geopolymer was made by blending 61 wt % of a mixed silicate solution (Na, K) having a molar ratio of 0.58 and a concentration of 5.5 mol·L$^{-1}$ with 35 wt % of a metakaolin, followed by addition of 0.12 wt % of an alkyl polyglucoside non-ionic surfactant., then 4 wt % of silica fibres.

The fibres were dispersed in the mixture by stirring at 1100 rpm for 30 minutes using a IKA RW20 digital overhead stirrer after being added to the mixture used to make the geopolymer. The estimated energy input during stirring of the fibres was 32,400 J.

The geopolymer mixture was stirred at 600 rpm for 5 minutes using a IKA RW20 digital overhead stirrer with a shaft (crossed) stirrer to form the geopolymer foam. The estimated energy input during foaming was 3600 J.

The method was performed in a 630 cm$^3$ recipient.

The geopolymer was cured at 40° C. in 100% HR atmosphere for 24 hours. Then, the material was dried at 40° C. before compressive and thermal analysis.

The porosity of the geopolymer was 83% with a density of 0.36 g·cm$^3$. The average pore size was 109 μm.

The thermal conductivity of the geopolymer was determined as described above in relation to Example 1.

The thermal conductivity of the geopolymer was 85 mW·m$^{-1}$·K$^{-1}$.

The compressive strength of the geopolymer was determined as described above in relation to Example 1.

The compressive strength of the geopolymer was 6 MPa.

The sound absorption properties of the geopolymer were determined using the impedance tube method. The impedance tube had an internal diameter of 2.9 cm (corresponding to an upper frequency limit of 6400 Hz) and two 1.4" microphones mounted at a distance of 2 cm, for measurements above 400 Hz. The principle was based on the transfer function measurements between the two microphones, as described in the NF EN ISO 10534-2 standard. With this method, incident and reflection waves were separated to determine the sound pressure reflection coefficient, R, at the frequencies in the range 400-6400 Hz. The sound absorption coefficient, a, was calculated applying the formula α=1−|R2|. The tests were performed on cylindrical samples (diameter of 2.9 cm, height of 2.5 cm), with planar and polished surfaces. The test was repeated on three different samples for each composition and the mean was calculated.

The geopolymer had an absorption coefficient within class D at all frequencies between 500 Hz and 4000 Hz.

Example 3—Chemically-Foamed Geopolymer (Comparative)

A chemically-foamed geopolymer was made by blending 61% wt of a mixed silicate solution (Na,K) having a molar ratio of 0.58 and a concentration of 5,5 mol·L$^{-1}$ of alkali cation with 35 wt % of a metakaolin, followed by addition of 0.12% wt of an alkyl polyglucoside non-ionic surfactant, then 4 wt % of silica fibres, then 0.6% of a mixture of 50% Si$^0$ and 50% Al$^0$.

The fibres were dispersed in the mixture by stirring at 1100 rpm for 30 minutes using a IKA RW20 digital overhead stirrer after being added to the mixture used to make the geopolymer. The estimated energy input during stirring of the fibres was 32,400 J.

The geopolymer mixture was stirred at 600 rpm for 5 minutes using a IKA RW20 digital overhead stirrer using a shaft (crossed) stirrer to form the geopolymer foam. The estimated energy input during foaming was 3600 J.

The method was performed in a 630 cm³ recipient.

The geopolymer was cured at 40° C. in 100% HR atmosphere for 24 hours. Then, the material was dried at 40° C. before compressive and thermal analysis.

The porosity of the geopolymer was 84% with a density of 0.34 g·cm³. The average pore size was 3241 μm.

The thermal conductivity of the geopolymer was determined as described above in relation to Example 1.

The thermal conductivity of the geopolymer was 84 mW·m⁻¹·K⁻¹.

The compressive strength of the geopolymer was determined in accordance with NF EN 826. A LLOYD EZ20 universal testing machine with a crosshead speed of 0.5 mm/min was used. The compressive test was performed on two samples for every formulation.

The samples were parallelepipedic in shape with a width of 50 mm, a length of 50 mm and a height of approximately 25 mm, and were aged for 7 days.

The compressive strength of the geopolymer was 0.0125 MPa.

Example 4—Chemically-Foamed Geopolymer (Comparative)

A chemically-foamed geopolymer was made by blending 61 wt % of a mixed silicate solution (Na,K) having a molar ratio of 0.58 and a concentration of 5.5 mol·L⁻¹ of alkali cation with 0.12% wt of an alkyl polyglucoside non-ionic surfactant, followed by addition of 35 wt % of a metakaolin, then 4 wt % of silica fibers, then 0.6% of a mixture of 50% Si⁰ and 50% Al⁰.

The fibres were dispersed in the mixture by stirring at 2100 rpm for 30 minutes using a IKA RW20 digital overhead stirrer after being added to the mixture used to make the geopolymer. The estimated energy input during stirring of the fibres was 25,200 J.

The geopolymer mixture was stirred at 600 rpm for 3 minutes using a IKA RW20 digital overhead stirrer using a straight blade stirrer to make the geopolymer foam. The estimated energy input during foaming was 1080 J.

The method was performed in a 1300 cm³ recipient.

The geopolymer was cured at 40° C. in 100% HR atmosphere for 24 hours. Then, the material was dried at 40° C. before compressive and thermal analysis The porosity of the geopolymer was 95% with a density of 0.11 g·cm³. The average pore size was 2861 μm.

The thermal conductivity of the geopolymer was determined as described above in relation to Example 1.

The thermal conductivity of the geopolymer was 53 mW·m⁻¹·K⁻¹.

The compressive strength of the geopolymer was determined as described above in relation to Example 3.

The compressive strength of the geopolymer was 0.0192 MPa.

The acoustic properties of the geopolymer were determined as described in above in relation to Example 2.

The geopolymer had an absorption coefficient within class E at 500 Hz, class D at 1000 Hz, class C at 2000 Hz, and class A at 4000 Hz.

Example 5—Blend of Mechanically-Foamed And Chemically-Foamed Geopolymer

A blend of 25 wt % of the uncured mechanically-foamed geopolymer in accordance with example 2 and 75 wt % of the uncured chemically-foamed geopolymer in accordance with example 4 was made by mixing for 1 minute at 400 rpm using a IKA RW20 digital overhead stirrer using a straight blade. The geopolymer blend was then cured at 40° C. in 100% HR atmosphere for 24 hours. Then, the material was dry during 40° C. before compressive and thermal analysis. The thermal conductivity of the geopolymer blend was determined as described above in relation to Example 1.

The thermal conductivity of the geopolymer blend was 69 mW·m⁻¹·K⁻¹.

The compressive strength of the geopolymer blend was determined as described above in relation to Example 3.

The compressive strength of the geopolymer blend was 0.044 MPa.

Example 6—Blend of Mechanically-Foamed And Chemically-Foamed Geopolymer

A blend of 75 wt % of the uncured mechanically-foamed geopolymer in accordance with example 2 and 25 wt % of the uncured chemically-foamed geopolymer in accordance with example 4 was made by mixing for 1 minute at 400 rpm using a IKA RW20 digital overhead stirrer using a straight blade.

The geopolymer blend was then cured at 40° C. in 100% HR atmosphere for 24 hours.

Then, the material was dry during 40° C. before compressive and thermal analysis.

The thermal conductivity of the geopolymer blend was determined as described above in relation to Example 1.

The thermal conductivity of the geopolymer blend was 74 mW·m⁻¹·K⁻¹.

The compressive strength of the geopolymer blend was determined as described above in relation to Example 3.

The compressive strength of the geopolymer blend was 0.752 MPa.

Example 7—Multi-Layer Geopolymer

A multilayer geopolymer composition was made by casting an 8 mm layer of a uncured mechanically-foamed geopolymer composition in accordance with example 2, followed by curing for 4 hours at 40° C. in 100% HR (relative humidity) atmosphere, followed by casting a 25 mm layer of an uncured chemically-foamed geopolymer composition in accordance with example 4 on top of the 8 mm layer of the mechanically-foamed geopolymer, followed by curing for 4 hours at 40° C. in 100% HR atmosphere, followed by casting another 8 mm layer of an uncured mechanically-foamed geopolymer composition [in accordance with example 2, followed by curing for 4 hours at 40° C. in 100% HR atmosphere.

The thermal conductivity of the geopolymer multilayer structure was calculated from the thermal conductivity value of each layer using the following equation $$\lambda_{Multilayer} = \frac{e_{Multilayer}}{R_{Multilayer}} = \frac{e_{Multilayer}}{2*\frac{e_1}{\lambda_1} + \frac{e_2}{\lambda_2}}$$

where λ is the thermal conductivity, e is the thickness and R is the thermal resistance. Thus, for the multi-layer composition of Example 7, the thermal conductivity is 41/ (2*(8/93)+(25/58))=68 mW·m$^{-1}$·K$^{-1}$.

The thermal conductivity of the geopolymer multilayer structure was 68 mW·m$^{-1}$·K$^{-1}$.

The compressive strength of the geopolymer multilayer structure was determined as described above in relation to Example 3.

The compressive strength of the geopolymer multilayer structure was 0.042 MPa.

The following numbered paragraphs define particular embodiments of the present invention:

1. A geopolymer foam composition comprising a mechanically-foamed aluminosilicate geopolymer and a chemically-foamed aluminosilicate geopolymer.
2. The geopolymer foam composition of paragraph 1, wherein the geopolymer foam composition comprises a blend of a mechanically-foamed aluminosilicate geopolymer and a chemically-foamed aluminosilicate geopolymer.
3. The geopolymer foam composition of paragraph 1 or 2, wherein the geopolymer foam composition comprises at least one layer of a mechanically-foamed aluminosilicate geopolymer and/or at least one layer of a chemically-foamed aluminosilicate geopolymer.
4. The geopolymer foam composition of paragraph 3, wherein the geopolymer foam composition comprises one layer of chemically-foamed aluminosilicate geopolymer between two layers of mechanically-foamed aluminosilicate geopolymer.
5. The geopolymer foam composition of paragraph 4, wherein the layer of chemically-foamed aluminosilicate geopolymer has a thickness ranging from about 20 mm to about 30 mm and/or wherein each layer of mechanically-foamed geopolymer has a thickness ranging from about 4 mm to about 12 mm.
6. The geopolymer foam composition of any preceding paragraph, wherein the geopolymer foam composition comprises from about 1 wt % to about 99 wt % of the mechanically-foamed geopolymer.
7. The geopolymer foam composition of any preceding paragraph, wherein the geopolymer foam composition comprises from about 1 wt % to about 99 wt % of the chemically-foamed geopolymer.
8. The geopolymer foam composition of any preceding paragraph, wherein the geopolymer foam composition has a compression resistance equal to or greater than about 0.01 MPa.
9. The geopolymer foam composition of any preceding paragraph, wherein the geopolymer foam composition has a thermal conductivity equal to or less than about 300 mW·m$^{-1}$·K$^{-1}$.
10. The geopolymer foam composition of any preceding paragraph, wherein the geopolymer foam composition is a class A fire-resistant material.
11. The geopolymer foam composition of any preceding paragraph, wherein the mechanically-foamed geopolymer and/or the chemically-foamed geopolymer further comprises one or more fillers, for example selected from silicates and fibres.
12. The geopolymer foam composition of any preceding paragraph, wherein the mechanically-foamed geopolymer and/or the chemically-foamed geopolymer further comprises one or more surfactants.
13. A geopolymer foam composition comprising an aluminosilicate geopolymer foam having an average pore size ranging from about 1 μm to about 500 μm and an aluminosilicate geopolymer foam having an average pore size ranging from greater than about 500 μm to about 5000 μm.
14. The geopolymer foam composition of paragraph 13, wherein the geopolymer foam composition comprises a blend of an aluminosilicate geopolymer foam having an average pore size ranging from about 1 μm to about 500 μm and an aluminosilicate geopolymer foam having an average pore size ranging from greater than about 500 μm to about 5000 μm.
15. The geopolymer foam composition of paragraph 13 or 14, wherein the geopolymer foam composition comprises at least one layer of an aluminosilicate geopolymer foam composition having an average pore size ranging from about 1 μm to about 500 μm and/or at least one layer of an aluminosilicate geopolymer foam composition having an average pore size ranging from greater than about 500 μm to about 5000 μm.
16. The geopolymer foam composition of paragraph 15, wherein the geopolymer foam composition comprises one layer of an aluminosilicate geopolymer foam composition having an average pore size ranging from about 1 μm to about 500 μm and one layer of an aluminosilicate geopolymer foam composition having an average pore size ranging from greater than about 500 μm to about 5000 μm.
17. The geopolymer foam composition of paragraph 16, wherein the layer of aluminosilicate geopolymer foam composition having an average pore size ranging from about 1 μm to about 500 μm has a thickness ranging from about 20 mm to about 30 mm and/or wherein each layer of aluminosilicate geopolymer foam composition having an average pore size ranging from greater than about 500 μm to about 5000 μm has a thickness ranging from about 4 mm to about 12 mm.
18. The geopolymer foam composition of any of paragraphs 13 to 17, wherein the geopolymer foam composition comprises from about 1 wt % to about 99 wt % of the aluminosilicate geopolymer foam composition having an average pore size ranging from about 1 μm to about 500 μm.
19. The geopolymer foam composition of any of paragraphs 13 to 18, wherein the geopolymer foam composition comprises from about 1 wt % to about 99 wt % of the aluminosilicate geopolymer foam composition having an average pore size ranging from greater than about 500 μm to about 5000 μm.
20. The geopolymer foam composition of any of paragraphs 13 to 19, wherein the geopolymer foam composition has a compression resistance equal to or greater than about 0.01 MPa.
21. The geopolymer foam composition of any of paragraphs 13 to 20, wherein the geopolymer foam composition has a thermal conductivity equal to or less than about 300 mW·m$^{-1}$·K$^{-1}$.
22. The geopolymer foam composition of any of paragraphs 13 to 21, wherein the geopolymer foam composition is a class A fire-resistant material.
23. The geopolymer foam composition of any of paragraphs 13 to 22, wherein the aluminosilicate geopolymer foam composition having an average pore size ranging from about 1 µm to about 500 µm and/or the aluminosilicate geopolymer foam composition having an average pore size ranging from greater than about 500 µm to about 5000 µm further comprises one or more fillers, for example selected from silicates and fibres.

24. The geopolymer foam composition of any of paragraphs 13 to 23, wherein the aluminosilicate geopolymer foam composition having an average pore size ranging from about 1 µm to about 500 µm and/or the aluminosilicate geopolymer foam composition having an average pore size ranging from greater than about 500 µm to about 5000 µm further comprises one or more surfactants.

25. A method for making a geopolymer foam composition, the method comprising combining a mechanically-foamed aluminosilicate geopolymer and a chemically-foamed aluminosilicate geopolymer.

26. The method of paragraph 25, wherein the method comprises casting the mechanically-foamed aluminosilicate geopolymer and/or the chemically-foamed aluminosilicate geopolymer.

27. The method of paragraph 25 or 26, further comprising curing the mechanically-foamed aluminosilicate geopolymer and/or the chemically-foamed aluminosilicate geopolymer.

28. The method of paragraph 27, wherein the method comprises blending the mechanically-foamed aluminosilicate geopolymer and the chemically-foamed aluminosilicate geopolymer.

29. The method of paragraph 28, wherein the method comprises casting the blend of the mechanically-foamed aluminosilicate geopolymer and the chemically-foamed aluminosilicate geopolymer.

30. The method of paragraph 28 or 29, wherein the method comprises curing the blend of the mechanically-foamed aluminosilicate geopolymer and the chemically-foamed aluminosilicate geopolymer.

31. The method of paragraph 25, wherein the method comprises forming at least one layer of the mechanically-foamed aluminosilicate geopolymer and/or at least one layer of the chemically-foamed aluminosilicate geopolymer.

32. The method of paragraph 31, wherein the method comprises forming one layer of chemically-foamed aluminosilicate geopolymer between two layers of mechanically-foamed aluminosilicate geopolymer.

33. The method of paragraph 31, wherein the method comprises casting a layer of the mechanically-foamed aluminosilicate geopolymer and/or casting a layer of the chemically-foamed aluminosilicate geopolymer.

34. The method of paragraph 32, wherein the method comprises casting a layer of mechanically-foamed aluminosilicate geopolymer, casting a layer of chemically-foamed aluminosilicate geopolymer on the layer of mechanically-foamed aluminosilicate geopolymer, and casting a layer of mechanically-foamed aluminosilicate geopolymer on the layer of chemically-foamed aluminosilicate geopolymer.

35. The method of any of paragraphs 31 to 34, wherein the method comprises curing the geopolymer foam composition after the layers of mechanically-foamed aluminosilicate and/or chemically-foamed geopolymer have been formed.

36. The method of any of paragraphs 25 to 35, wherein the method comprises making the mechanically-foamed aluminosilicate geopolymer.

37. The method of any of paragraphs 25 to 36, wherein the method comprising making the chemically-foamed aluminosilicate geopolymer.

38. A method for making a geopolymer foam composition, the method comprising combining a aluminosilicate geopolymer foam composition having an average pore size ranging from about 1 µm to about 500 µm and a aluminosilicate geopolymer foam composition having an average pore size ranging from greater than about 500 µm to about 5000 µm.

39. The method of paragraph 38, wherein the method comprises casting the aluminosilicate geopolymer foam composition having an average pore size ranging from about 1 µm to about 500 µm and/or the aluminosilicate geopolymer foam composition having an average pore size ranging from greater than about 500 µm to about 5000 µm.

40. The method of paragraph 38 or 39, further comprising curing the aluminosilicate geopolymer foam composition having an average pore size ranging from about 1 µm to about 500 µm and/or the aluminosilicate geopolymer foam composition having an average pore size ranging from greater than about 500 µm to about 5000 µm.

41. The method of paragraph 38, wherein the method comprises blending the aluminosilicate geopolymer foam composition having an average pore size ranging from about 1 µm to about 500 µm and the aluminosilicate geopolymer foam composition having an average pore size ranging from greater than about 500 µm to about 5000 µm.

42. The method of paragraph 41, wherein the method comprises casting the blend of the aluminosilicate geopolymer foam composition having an average pore size ranging from about 1 µm to about 500 µm and the aluminosilicate geopolymer foam composition having an average pore size ranging from greater than about 500 µm to about 5000 µm.

43. The method of paragraph 41 or 42, wherein the method comprises curing the blend of the aluminosilicate geopolymer foam composition having an average pore size ranging from about 1 µm to about 500 µm and the aluminosilicate geopolymer foam composition having an average pore size ranging from greater than about 500 µm to about 5000 µm.

44. The method of paragraph 38, wherein the method comprises forming at least one layer of the aluminosilicate geopolymer foam composition having an average pore size ranging from about 1 µm to about 500 µm and/or at least one layer of the aluminosilicate geopolymer foam composition having an average pore size ranging from greater than about 500 µm to about 5000 µm.

45. The method of paragraph 44, wherein the method comprises forming one layer of aluminosilicate geopolymer foam composition having an average pore size ranging from greater than about 500 µm to about 5000 µm between two layers of aluminosilicate geopolymer foam composition having an average pore size ranging from about 1 µm to about 500 µm.

46. The method of paragraph 44, wherein the method comprises casting a layer of the aluminosilicate geopolymer foam composition having an average pore size ranging from about 1 µm to about 500 µm and/or casting a layer of the aluminosilicate geopolymer foam composition having an average pore size ranging from greater than about 500 µm to about 5000 µm.

47. The method of paragraph 46, wherein the method comprises casting a layer of aluminosilicate geopolymer foam composition having an average pore size ranging from about 1 µm to about 500 µm, casting a layer of aluminosilicate geopolymer foam composition having an average pore size ranging from greater than about 500 µm to about 5000 µm on the layer of aluminosilicate geopolymer foam composition having an average pore size ranging from about 1 µm to about 500 µm, and casting a layer of aluminosilicate geopolymer foam composition having an average pore size ranging from about 1 to about 500 on the layer of aluminosilicate geopolymer foam composition having an average pore size ranging from greater than about 500 µm to about 5000 µm.

48. The method of any of paragraphs 44 to 47, wherein the method comprises curing the geopolymer foam composition after the layers of aluminosilicate geopolymer foam composition having an average pore size ranging from about 1 µm to about 500 µm and/or aluminosilicate geopolymer foam composition having an average pore size ranging from greater than about 500 µm to about 5000 µm have been formed.

49. The method of any of paragraphs 38 to 48, wherein the method comprises making the aluminosilicate geopolymer foam composition having an average pore size ranging from about 1 µm to about 500 µm.

50. The method of any of paragraphs 38 to 49, wherein the method comprising making the aluminosilicate geopolymer foam composition having an average pore size ranging from greater than about 500 µm to about 5000 µm.

51. A geopolymer foam composition obtainable by and/or obtained by the method of any of paragraphs 13 to 25.

52. The geopolymer foam composition of paragraph 26, wherein the geopolymer foam composition is according to any one of paragraphs 1 to 12.

53. A geopolymer foam composition obtainable by and/or obtained by the method of any of paragraphs 25 to 52.

54. The geopolymer foam composition of paragraph 53, wherein the geopolymer foam composition is according to any one of paragraphs 1 to 24.

55. An article comprising a geopolymer foam composition of any one of paragraphs 1 to 24, 53, or 54.

56. Use of a geopolymer foam composition of any one of paragraphs 1 to 24, 53 or 54 for compression resistance, thermal insulation, sound insulation, heat-resistance, fire-resistance, filtration, and/or conduction, exchange and/or capture of chemical elements.

The foregoing broadly describes certain embodiments of the present invention without limitation. Variations and modifications as will be readily apparent to those skilled in the art are intended to be within the scope of the present invention as defined in and by the appended claims.

The invention claimed is:

1. A geopolymer foam composition comprising a mechanically-foamed aluminosilicate geopolymer and a chemically-foamed aluminosilicate geopolymer, wherein the geopolymer foam composition comprises at least one layer of a mechanically-foamed aluminosilicate geopolymer and/or at least one layer of a chemically-foamed aluminosilicate geopolymer.

2. The geopolymer foam composition of claim 1, wherein the geopolymer foam composition comprises a blend of a mechanically-foamed aluminosilicate geopolymer and a chemically-foamed aluminosilicate geopolymer.

3. The geopolymer foam composition of claim 1, wherein the geopolymer foam composition has a compression resistance equal to or greater than about 0.01 MPa.

4. The geopolymer foam composition of claim 1, wherein the geopolymer foam composition has a thermal conductivity equal to or less than about 300 $mw \cdot m^{-1} \cdot K^{-1}$.

5. The geopolymer foam composition of claim 1, wherein the geopolymer foam composition is a call A fire-resistant material.

6. The geopolymer foam composition of claim 1, wherein the mechanically-foamed geopolymer and/or the chemically-foamed geopolymer further comprises one or more fillers.

7. The geopolymer foam composition of claim 1, wherein the mechanically-foamed geopolymer has an average pore size ranging from about 1 µm to about 500 µm or wherein the chemically-foamed geopolymer has an average pore size ranging from greater than about 500 µm to about 5000 µm.

8. An article comprising the geopolymer foam composition of claim 1.

9. The article of claim 8, wherein the article is thermal insulation, sound insulation, or a fire retardant material.

10. The article of claim 8, wherein the article is a filter.

11. The article of claim 9, wherein the article is a filter or device for the conduction, exchange, and/or capture of chemical elements.

12. A method for making a geopolymer foam composition, the method comprising combining a mechanically-foamed aluminosilicate geopolymer and a chemically-foamed aluminosilicate geopolymer, and wherein the method comprises forming at least one layer of the mechanically-foamed aluminosilicate geopolymer and/or at least one layer of the chemically-foamed aluminosilicate geopolymer.

13. The method of claim 12, wherein the method further comprises blending the mechanically-foamed aluminosilicate geopolymer and the chemically-foamed aluminosilicate geopolymer.

14. The method of claim 12, wherein the method comprises making the mechanically-foamed aluminosilicate geopolymer and/or making the chemically-foamed aluminosilicate geopolymer.

15. A geopolymer foam composition obtained by the method of claim 12.

* * * * *